United States Patent
Wang et al.

(10) Patent No.: US 8,520,296 B2
(45) Date of Patent: *Aug. 27, 2013

(54) SUB-PIXEL STRUCTURE AND PIXEL STRUCTURE OF COLOR ELECTROPHORETIC DISPLAY

(71) Applicant: E Ink Holdings Inc., Hsinchu County (TW)

(72) Inventors: Yi-Ching Wang, Hsinchu (TW); Tzu-Ming Wang, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/655,463

(22) Filed: Oct. 19, 2012

(65) Prior Publication Data

US 2013/0114127 A1 May 9, 2013

Related U.S. Application Data

(63) Continuation of application No. 12/344,464, filed on Dec. 27, 2008, now Pat. No. 8,319,724.

(51) Int. Cl.
*G02B 26/00* (2006.01)
*G09G 3/34* (2006.01)

(52) U.S. Cl.
USPC .......................................... 359/296; 345/107

(58) Field of Classification Search
CPC ....................................................... G02B 26/00
USPC .......................................... 345/107; 359/296
See application file for complete search history.

(56) References Cited

U.S. PATENT DOCUMENTS

| 7,002,728 B2 | 2/2006 | Pullen et al. |
| 8,319,724 B2 * | 11/2012 | Wang et al. .................... 345/107 |
| 2005/0012708 A1 | 1/2005 | Liu |
| 2008/0055234 A1 | 3/2008 | Chopra et al. |

FOREIGN PATENT DOCUMENTS

| CN | 101030011 A | 9/2007 |
| CN | 100397227 C | 6/2008 |
| CN | 101782707 B | 6/2013 |
| JP | 2002513169 A | 5/2002 |
| JP | 2008209526 A | 5/2002 |
| JP | 2005205021 A | 8/2005 |
| JP | 2006343457 A | 12/2006 |
| JP | 2007156151 A | 6/2007 |
| JP | 2007171482 A | 7/2007 |
| JP | 2007264285 A | 10/2007 |
| JP | 2008116513 A | 5/2008 |

OTHER PUBLICATIONS

English Language Translation for JP 2006-343457A (automated translation) downloaded from IPDL website http://www4.ipdl.inpit.go.jp, Mar. 23, 2013.*

* cited by examiner

*Primary Examiner* — David N Spector
(74) *Attorney, Agent, or Firm* — Chun-Ming Shih

(57) ABSTRACT

A sub-pixel structure of color electrophoretic display includes a driving unit, a display unit and a transparent electrode, wherein the display unit is disposed on the driving unit and the transparent electrode is disposed on the display unit. The display unit includes a plurality of first charged particles and a plurality of second charged particles. A color of the first charged particles is different from a color of the second charged particles. Diameters of the first charged particles are greater than diameters of the second charged particles. The first charged particles and the second charged particles have the same electrical property. The sub-pixel structure of color electrophoretic display has high light utility efficiency.

5 Claims, 6 Drawing Sheets

SUB-PIXEL STRUCTURE AND PIXEL STRUCTURE OF COLOR ELECTROPHORETIC DISPLAY

CROSS-REFERENCE TO RELATED APPLICATIONS

This application is a continuation application of an application Ser. No. 12/344,464, filed on Dec. 27, 2008, and the entire contents of which are incorporated herein by reference.

BACKGROUND

1. Field of the Invention

The present invention relates to an electrophoretic display (EPD), and particularly to a pixel structure and a sub-pixel structure of a color electrophoretic display.

2. Description of the Related Art

With the advancement of the flat display technology and the flat displays having advantages of light in weight, small in size and low power consuming, the flat displays have become more and more popular. In general, the flat displays includes liquid crystal display (LCD), plasma display panel (PDP), organic light emitting diode display (OLED display) and electrophoretic display, etc., wherein the electrophoretic display does not include light emitting source, so the electrophoretic display further has the advantage of power saving in comparison with other flat displays.

The conventional electrophoretic display is a monochrome display. However, for promoting the market competitiveness of the conventional electrophoretic display, a color filter is used in the conventional technique to colorize the electrophoretic display. Such that, the conventional electrophoretic display can achieve color display. However, the light utility efficiency of the electrophoretic display is reduced by the color filter, and thus the brightness, the contrast and the color saturation of the electrophoretic display are reduced.

BRIEF SUMMARY

The present invention relates to a sub-pixel structure of color electrophoretic display for improving the light utility efficiency of the color electrophoretic display.

The present invention further relates to a pixel structure of color electrophoretic display having better light utility efficiency.

The present invention further relates to a pixel structure of color electrophoretic display for improving the light utility efficiency of the color electrophoretic display.

To achieve the above-mentioned advantages, a sub-pixel structure of color electrophoretic display is provided. The cub-pixel includes a driving unit, a display unit and a transparent electrode. The display unit is disposed on the driving unit and the transparent electrode is disposed on the display unit. The display unit includes a plurality of first charged particles and a plurality of second charged particles. A color of the first charged particles is different from a color of the second charged particles. Diameters of the first charged particles are greater than diameters of the second charged particles, and the first charged particles and the second charged particles have the same electrical property.

In an embodiment of the present invention, the color of the first charged particles is selected from one of red, green and blue or selected from one of cyan, magenta and yellow, and the color of the second charged particles is white.

In an embodiment of the present invention, the display unit further comprises a plurality of third charged particles, diameters of the third charged particles are smaller than the diameters of the first charged particles, the third charged particles and the first charged particles have opposite electrical properties, and the color of the first charged particles, the color of the second charged particles and a color of the third charged particles are different. Moreover, a range of the diameters of the third charged particles is the same with a range of the diameters of second charged particles. Furthermore, the color of the first charged particles is selected from one of red, green and blue or selected from one of cyan, magenta and yellow, the color of the second charged particles is white, and the color of third charged particles is black. In another embodiment, the colors of the first charged particles, the second charged particles and the third charged particles comprise red, green and blue or comprise cyan, magenta and yellow.

To achieve the above-mentioned advantages, a pixel structure of color electrophoretic display is further provided. The pixel structure includes a plurality of first sub-pixel structures. Each of the first sub-pixel structures includes a first driving unit, a first display unit and a first transparent electrode, wherein the first display unit is disposed on the first driving unit and the first transparent electrode is disposed on the first display unit. The first transparent electrode is used as a common electrode for the first sub-pixel structures. The first display unit includes a plurality of first charged particles, a plurality of second charged particles and a plurality of third charged particles. Diameters of the first charged particles are greater than diameters of the second charged particles and the third charged particles. The first charged particles and the second charged particles have the same electrical property, and the first charged particles and the third charged particles have opposite electrical properties. The first charged particles, the second charged particles and the third charged particles having different colors.

In an embodiment of the present invention, the first charged particles of the same first sub-pixel structure have the same color, the colors of the first charged particles of the first sub-pixel structures comprise red, green and blue or comprise cyan, magenta and yellow, the color the second charged particles is white and the color of the third charged particles is black.

In an embodiment of the present invention, a range of the diameters of the second charged particles is the same with a range of the diameters of the third charged particles.

In an embodiment of the present invention, the pixel structure of color electrophoretic display further includes a second sub-pixel structure. The second sub-pixel structure includes a second driving unit, a second display unit and a second transparent electrode, wherein the second display unit is disposed on the second driving unit and the second transparent electrode is disposed on the second display unit. The second display unit includes a plurality of fourth charged particles. A color of the fourth charged particles is different from the colors of the first charged particles, the second charged particles and the third charged particles. Diameters of the fourth charged particles are smaller than the diameters of the first charged particles.

In an embodiment of the present invention, the first charged particles have the same color, the second charged particles have the same color, the third charged particles have the same color, the colors of the first charged particles, the second charged particles and the third charged particles comprise cyan, magenta and yellow, and the color of the fourth charged particles is white.

In an embodiment of the present invention, the first charged particles have the same color, the second charged particles have the same color, the third charged particles have the same color, the colors of the first charged particles, the second charged particles and the third charged particles comprise red, green and blue, and the color of the fourth charged particles is black.

In an embodiment of the present invention, a range of the diameters of the second charged particles is the same with a range of the diameters of the third charged particles.

To achieve the above-mentioned advantages, a pixel structure of color electrophoretic display is further provided. The pixel structure includes a plurality of first sub-pixel structures and a second sub-pixel structure. Each of the first sub-pixel structures includes a first driving unit, a first display unit and a first transparent electrode, wherein the first display unit is disposed on the first driving unit and the first transparent electrode is disposed on the first display unit. The first transparent electrode is used as a common electrode for the first sub-pixel structures. The first display unit includes a plurality of first charged particles and a plurality of second charged particles. Diameters of the first charged particles are greater than diameters of the second charged particles. The first charged particles and the second charged particles have the same electrical property. The first charged particles and the second charged particles have different colors. Furthermore, the second sub-pixel structure includes a second driving unit, a second display unit and a second transparent electrode, wherein the second display unit is disposed on the second driving unit and the second transparent electrode is disposed on the second display unit. The second display unit includes plurality of third charged particles and a plurality of fourth charged particles. Diameters of the third charged particles and the fourth charged particles are smaller than diameters of the first charged particles. The third charged particles and the fourth charged particles have opposite electrical properties. A color of the third charged particles is different from a color of the fourth charged particles.

In an embodiment of the present invention, the first charged particles of the same first sub-pixel structure have the same color, the colors of the first charged particles of the first sub-pixel structures comprise red, green and blue or comprise cyan, magenta and yellow, the color of the second charged particles and the third charged particles is white, and the color of the fourth charged particles is black.

In an embodiment of the present invention, a range of the diameters of the second charged particles, a range of the diameters of the third charged particles and a range of the diameters of the fourth charged particles are the same.

In the present invention, a principle that charged particles with different diameters in a solution have different electrophoretic velocities is used to drive the charged particles with different colors in order to display multiple colors. Because the sub-pixel structure of the present invention does not need any color filter, the light utility efficiency of the sub-pixel structure of the present invention can be improved. Moreover, the pixel structure of color electrophoretic display according to each embodiment of the present invention using the above-mentioned sub-pixel structure to achieve color effects. Because the pixel structure of color electrophoretic display does not need any color filter, the light utility efficiency of the color electrophoretic display having a plurality of the pixel structures can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

An electrophoretic velocity of a charged particle in a solution can be expressed by the following equation:

$$m = q/6\pi\gamma\eta$$

Wherein, "m" represents the electrophoretic velocity of the charged particle in the solution, "q" represents the quantity of charge of the charged particle, "γ" represents the diameter of the charged particle, and "η" represents the viscosity of the solution. The above-mentioned equation shows that the electrophoretic velocity of the charged particle in the solution is inverse proportion to the diameter of the charged particle. In other words, larger the diameter of the charged particle is, slower the electrophoretic velocity of the charged particle in the solution is. According to the principle, embodiments of the present invention provide sub-pixel structures and pixel structures of color electrophoretic display.

Figure 1:
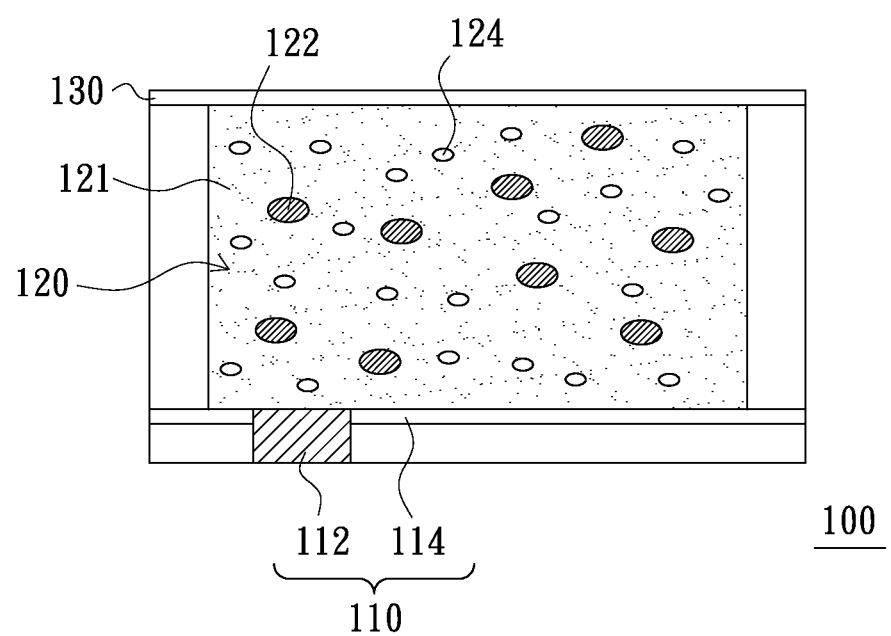
FIG. 1 is a schematic view of a sub-pixel structure of color electrophoretic display according to a first embodiment of the present invention.

FIG. 1 is a schematic view of a sub-pixel structure of color electrophoretic display according to a first embodiment of the present invention. Referring to FIG. 1, the sub-pixel structure 100 of a color electrophoretic display of the present embodiment includes a driving unit 110, a display unit 120 and a transparent electrode 130, wherein the display unit 120 is disposed on the driving unit 110, and the transparent electrode 130 is disposed on the display unit 120. The driving unit 110 can be an active driving unit or a passive driving unit, and the present embodiment takes the active driving unit as an example. The driving unit 110 includes a driving element 112 and an electrode 114 electrically connected with the driving element 112. The driving element 112 is, for example, a thin film transistor (TFT), and the electrode 114 can be served as a light absorbing layer. Moreover, the material of the transparent electrode 130 can be indium tin oxide (ITO), indium zinc oxide, (IZO), zinc oxide or indium gallium zinc oxide (IGZO).

Moreover, the display unit 120 can be a microencapsulated type display unit or a microcup type display unit, and the microcup type display unit is taken as an example in FIG. 1. The display unit 120 includes a solution 121, a plurality of first charged particles 122 and a plurality of second charged particles 124, wherein the first charged particles 122 and the second charged particles 124 are located in the solution 121. Further, the material of the first charged particles 122 and the second charged particles 124 can be organic material or inorganic material such as titanium dioxide. Ranges of diameters of the first charged particles 122 and the second charged particles 124 are between 0.01 micrometers and 2 micrometers, and the range of the diameters of the first charged particles 122 is greater than the range of the diameters of the second charged particles 124. Further, the first charged particles 122 and the second charged particles 124 have the same electrical property, and that means that both the first charged particles 122 and the second charged particles 124 are positive particles or negative particles. A color of the first charged particles 122 is different to a color of the second charged particles 124. For example, the color of the first charged particles 122 is selected from one of red, green and blue or selected from one of cyan, magenta and yellow, and the color of the second charged particles 124 is white.

Figure 2:
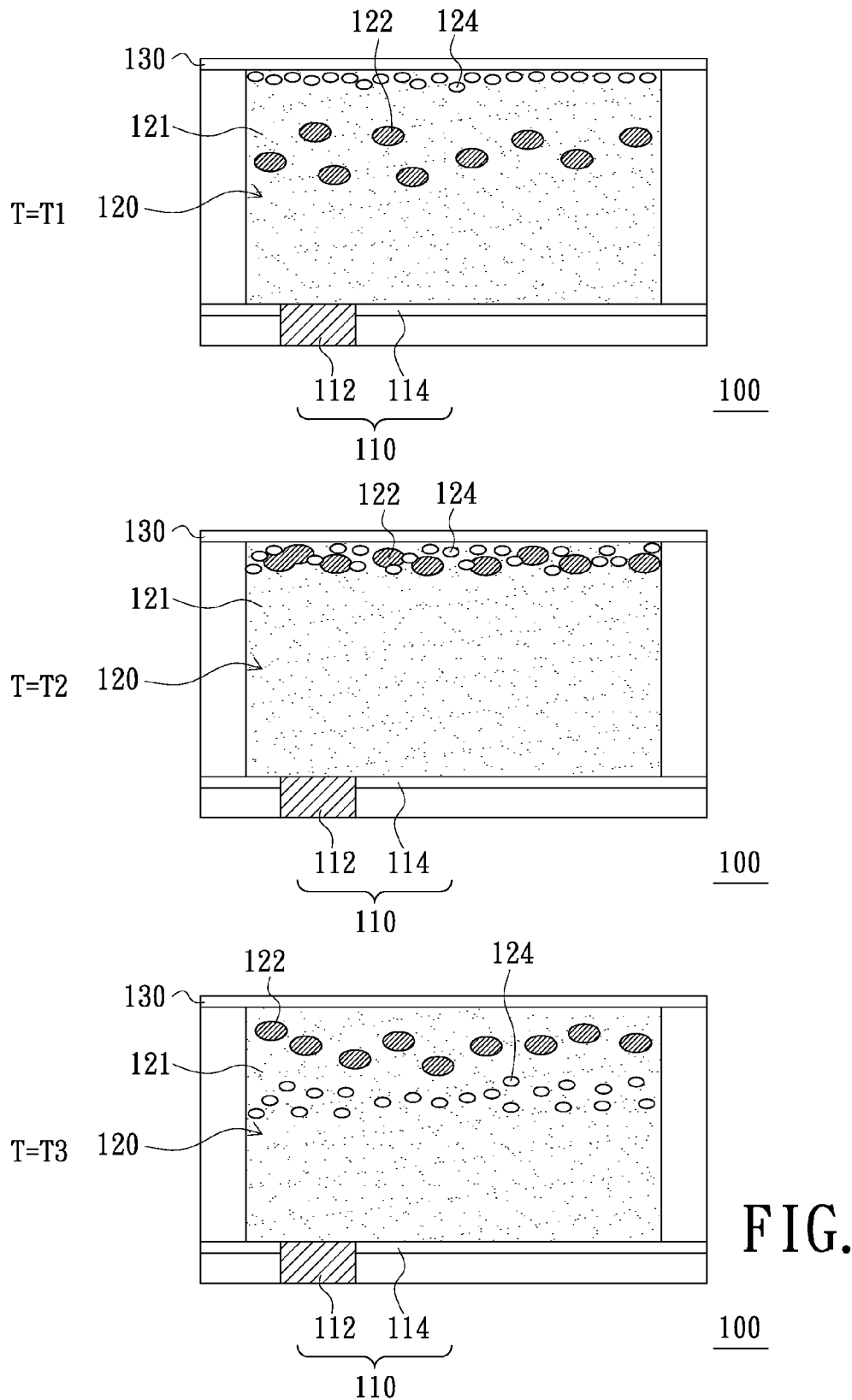
FIG. 2 is schematic views showing the sub-pixel structure of the first embodiment of the present invention at different states.

FIG. 2 is schematic views showing the sub-pixel structure of the first embodiment of the present invention at different states. Referring to FIG. 2, in the condition that the first charged particles 122 and the second charged particles 124 are positive particles, when the sub-pixel structure 100 is used to display the color of the second charged particles 124, a positive potential is applied to the electrode 114. Such that, the first charged particles 122 and the second charged particles 124 are moved towards the transparent electrode 130. Due to the diameters of the second charged particles 124 being smaller than the diameters of the first charged particles 122, the electrophoretic velocity of the second charged particles 124 is greater than the electrophoretic velocity of the first charged particles 122. Such that, when the time T arrives at T1, the second charged particles 124 are moved to near the transparent electrode 130 and the first charged particles 122 are not moved to near the transparent electrode 130 yet. At this time, the positive potential applied to the electrode 114 is stopped to let the first charged particles 122 and the second charged particles 124 be stopped. And then, the sub-pixel structure 100 displays the color of the second charged particles 124 (e.g. white).

When the sub-pixel structure 100 is used to display the color of the first charged particles 122, the positive potential is continued to be applied to the electrode 114. Then, when the time T arrives at T2, the first charged particles 122 and the second charged particles 124 are moved to near the transparent electrode 130. And than, a negative potential is applied to the electrode 114 to let the first charged particles 122 and the second charged particles 124 be moved towards the electrode 114. Due to the electrophoretic velocity of the second charged particles 124 being faster, when the time T arrives at T3, the first charged particles 122 are still near the transparent electrode 130 but the second charged particles 124 are moved far away from the transparent electrode 130. At this time, the negative potential applied to the electrode 114 is stopped to let the first charged particles 122 and the second charged particles 124 be stopped. And then, the sub-pixel structure 100 displays the color of the first charged particles 122 (e.g. red, green, blue, cyan, magenta or yellow).

The present embodiment uses the principle that the electrophoretic velocity of the charged particle in the solution is inverse proportion to the diameter of the charged particle to drive the first charged particles 122 and the second charged particles 124 to let the sub-pixel structure 100 display the color of the first charged particles 122 or the color of the second charged particles 124. Because the sub-pixel structure 100 does not need any color filter, the light utility efficiency of the sub-pixel structure 100 can be improved. Moreover, a pixel structure can be composed of a plurality of the sub-pixel structures 100, and the color electrophoretic display includes a plurality of the pixel structures, wherein the colors of the first charged particles 122 of the sub-pixel structures 100 of each of the pixel structures are different. For example, each of the pixel structures may include three sub-pixel structures 100, and the colors of the first charged particles 122 of the three sub-pixel structures 100 can be red, blue and green respectively. The pixel structure will be described more detail with reference to the accompanying drawings.

Figure 3:
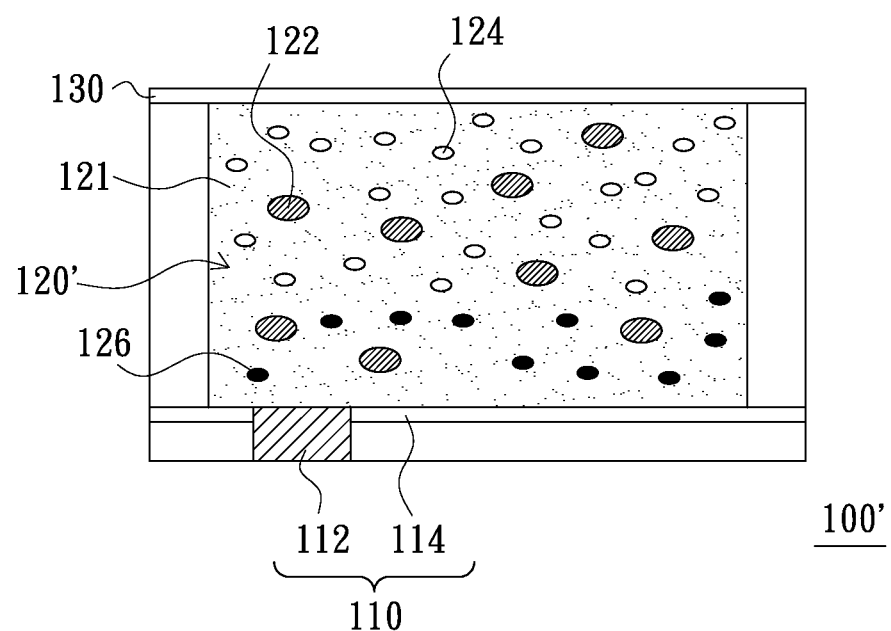
FIG. 3 is a schematic view of a sub-pixel structure according to a second embodiment of the present invention.

FIG. 3 is a schematic view of a sub-pixel structure according to a second embodiment of the present invention. Referring to FIG. 3, the sub-pixel structure 100' of the second embodiment is similar to the sub-pixel structure 100 of FIG. 1, and the difference is that the display unit 120' of the sub-pixel structure 100' further includes a plurality of third charged particles 126. Diameters of third charged particles 126 are smaller than the diameters of the first charged particles 122, and the ranges of the diameters of third charged particles 126 and the second charged particles 124 are, for example, the same. The third charged particles 126 and the first charged particles 122 have opposite electrical properties. For example, the first charged particles 122 and the second charged particles 124 are positive particles and the third charged particles 126 are negative particles. Moreover, the colors of the first charged particles 122, the second charged particles 124 and the third charged particles 126 are different. For example, the color of the first charged particles 122 can be selected from one of red, green, and blue or selected from one of cyan, magenta and yellow, the color of the second charged particles 124 is white and the color of the third charged particles 126 is black. In another embodiment, the colors of the first charged particles 122, the second charged particles 124 and the third charged particles 126 include red, green and blue or include cyan, magenta and yellow.

Figure 4:
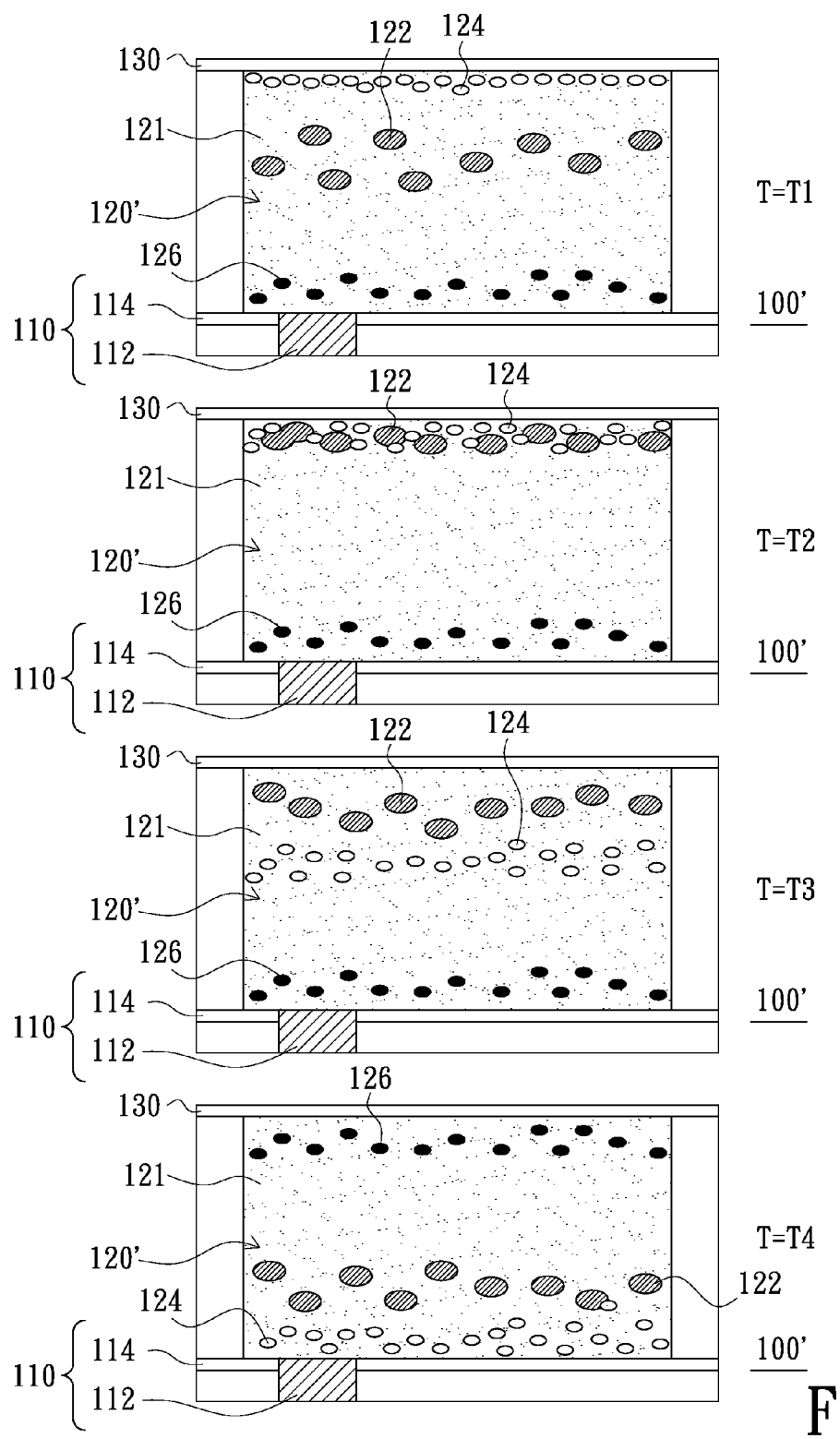
FIG. 4 is schematic views showing the sub-pixel structure of the second embodiment of the present invention at different states.

FIG. 4 is schematic views showing the sub-pixel structure of the second embodiment of the present invention at different states. Referring to FIG. 4, in the condition that the first charged particles 122 and the second charged particles 124 are positive particles and the third charged particles 126 are negative particles, the method to let the sub-pixel structure 100' display the color of the first charged particles 122 or the second charged particles 124 is similar to that of the first embodiment. In other words, when the time T arrives at T1, the sub-pixel structure 100' displays the color of the second charged particles 124, and when the time T arrives at T3, the sub-pixel structure 100' displays the color of the first charged particles 122.

Furthermore, when the sub-pixel structure 100' is used to display the color of the third charged particles 126, a negative potential is applied to the electrode 114 to let the first charged particles 122 and the second charged particles 124 be moved towards the electrode 114 and let the third charged particles be moved towards the transparent electrode 130. Such that, when the time T arrives at T4, the third charged particles 126 are moved to near the transparent electrode 130. At this time, the negative potential applied to the electrode 114 is stopped to let the first charged particles 122, the second charged particles 124 and the third charged particles 126 be stopped. And then, the sub-pixel structure 100' displays the color of the third charged particles 126.

Similar to the advantages of the first embodiment, the sub-pixel structure 100' of the second embodiment does not need any color filter, so the light utility efficiency of the sub-pixel structure 100' can be improved.

Figure 5:
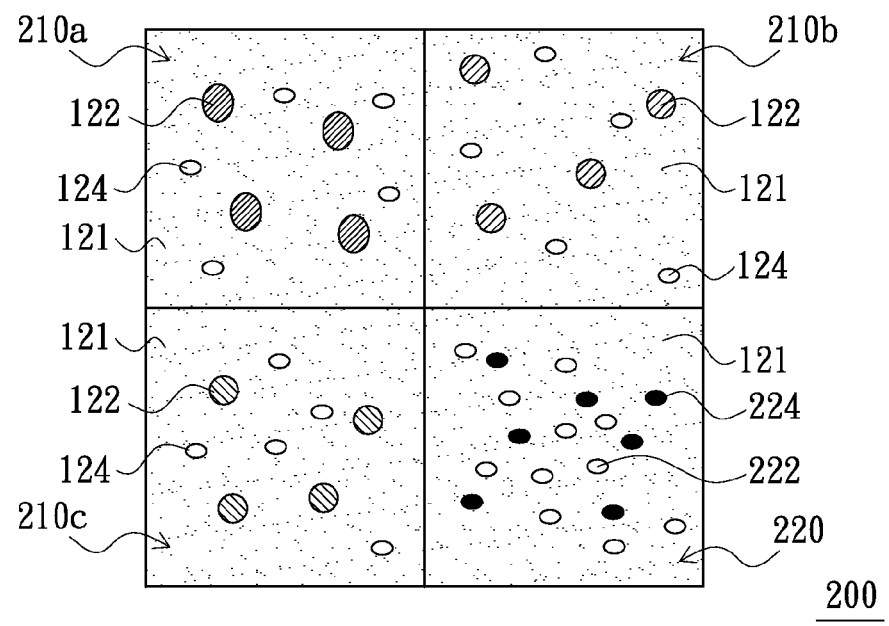
FIG. 5 is a schematic view of a pixel structure of color electrophoretic display according to a third embodiment of the present embodiment.

FIG. 5 is a schematic view of a pixel structure of color electrophoretic display according to a third embodiment of the present embodiment. Referring to FIGS. 1 and 5, the pixel structure 200 of a color electrophoretic display of the present embodiment includes a plurality of first sub-pixel structures and a second sub-pixel structure 220, wherein the colors of the first sub-pixel structures are different. For clear description, the numerals 210a, 210b and 210c are used to represent the first sub-pixel structures with different colors. Each of the first sub-pixel structures 210a, 210b and 210c includes a first driving unit, a first display unit and a first transparent electrode. The first transparent electrode is used as a common electrode for the first sub-pixel structures 210a, 210b and 210c. In the present embodiment, each of the first sub-pixel structures 210a, 210b and 210c can be the sub-pixel structure 100 of the first embodiment, but the colors of the first charged particles 122 of the first sub-pixel structures 210a, 210b and 210c are different. A detail description of the first driving unit, the first display unit and the first transparent electrode can refer to the description of the driving unit 110, the display unit 120 and the transparent electrode 130 of the first embodiment and is not repeated herein. Further, the first charged particles of the same first sub-pixel structure have the same color. For example, the color of the first charged particles 122 of the first sub-pixel structure 210a can be red, the color of the first charged particles 122 of the first sub-pixel structure 210b can be green, and the color of the first charged particles 122 of the first sub-pixel structure 210c can be blue.

The second sub-pixel structure 220 includes a second driving unit, a second display unit and a second transparent electrode, wherein a detail description of the second driving unit and the second transparent electrode can refer to the description of the driving unit 110 and the transparent electrode 130 of the first embodiment and is not repeated herein. Moreover, the second display unit of the second sub-pixel structure 220 includes a plurality of third charged particles 222 and a plurality of fourth charged particles 224. Diameters of the third charged particles 222 and the fourth charged particles 224 are smaller than the diameters of the first charged particles 122. The ranges of the diameters of the second charged particles 124, the third charged particles 222 and the fourth charged particles 224 are, for example, the same. The third charged particles 222 and the fourth charged particles 224 have opposite electrical properties. Furthermore, a color of the third charged particles 222 is different to a color of the fourth charged particles 224. For example, the color of the second charged particles 124 and the third charged particles 222 can be white, and the color of the fourth charged particles 224 can be black.

In the present embodiment, the first sub-pixel structure 210a is capable of displaying red or white, the first sub-pixel structure 210b is capable of displaying green or white, the first sub-pixel structure 210c is capable of displaying blue or white, and the second sub-pixel structure 220 is capable of displaying black or white. The method to let the first sub-pixel structures 210a, 210b and 210c display different colors is similar to that of the first embodiment and is not repeated herein. Moreover, the method to let the second sub-pixel structure 220 display black or white should be known by one skilled in the art and is not repeated herein.

In the present embodiment, a combination of the first sub-pixel structures 210a, 210b and 210c and the second sub-pixel structure 220 can let the pixel structure 200 be capable of displaying multiple different colors. Because the pixel structure 200 of the present embodiment does not need any color filter, the color electrophoretic having a plurality of the pixel structures 200 can have better light utility efficiency, brightness, contrast and color saturation. Moreover, in another embodiment, the color of the first charged particles 122 of the first sub-pixel structure 210a can be cyan, the color of the first charged particles 122 of the first sub-pixel structure 210b can be magenta, and the color of the first charged particles 122 of the first sub-pixel structure 210c can be yellow.

Figure 6:
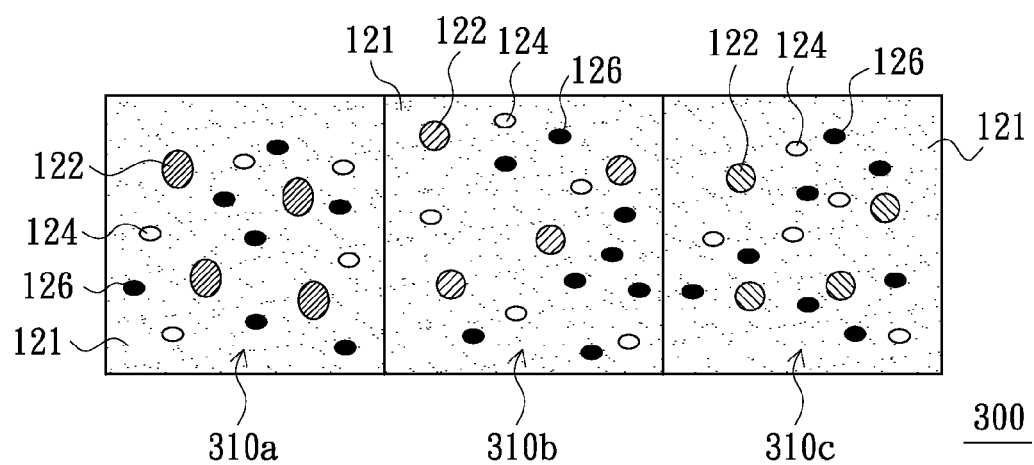
FIG. 6 is a schematic view of a pixel structure of color electrophoretic display according to a forth embodiment of the present invention.

FIG. 6 is a schematic view of a pixel structure of color electrophoretic display according to a forth embodiment of the present invention. Referring to FIGS. 3 and 6, the pixel structure 300 of the present embodiment includes a plurality of first sub-pixel structures, wherein the colors of the first sub-pixel structures are different. For clear description, the numerals 310a, 310b and 310c are used to represent the first sub-pixel structures with different colors. Each of the first sub-pixel structures 310a, 310b and 310c includes a first driving unit, a first display unit and a first transparent electrode. The first transparent electrode is used as a common electrode for the first sub-pixel structures 310a, 310b and 310c. In the present embodiment, each of the first sub-pixel structures 310a, 310b and 310c can be the sub-pixel structure 100' of the second embodiment, but the colors of the first charged particles 122 of the first sub-pixel structures 310a, 310b and 310c are different. A detail description of the first driving unit, the first display unit and the first transparent electrode can refer to the description of the driving unit 110, the display unit 120 and the transparent electrode 130 of the first embodiment and is not repeated herein.

The first charged particles 122 of the same first sub-pixel structure have the same color. For example, the color of the first charged particles 122 of the first sub-pixel structure 310a can be red, the color of the first charged particles 122 of the first sub-pixel structure 310b can be green, and the color of the first charged particles 122 of the first sub-pixel structure 310c can be blue. Moreover, the color of the second charged particles 124 can be white and the color of the third charged particles 126 can be black.

In the present embodiment, the first sub-pixel structure 310a is capable of displaying red, white or black, the first sub-pixel structure 310b is capable of displaying green, white or black, and the first sub-pixel structure 310c is capable of displaying display blue, white or black. A combination of the first sub-pixel structures 310a, 310b and 310c can let the pixel structure 300 be capable of displaying multiple different colors. Because the pixel structure 300 of the present embodiment dosed not need any color filter, the color electrophoretic having a plurality of the pixel structures 300 can have better light utility efficiency, brightness, contrast and color saturation.

The method to let the first sub-pixel structures 310a, 310b and 310c display different colors is similar to that of the second embodiment and is not repeated herein. Moreover, in another embodiment, the color of the first charged particles 122 of the first sub-pixel structure 310a can be cyan, the color of the first charged particles 122 of the first sub-pixel structure 310b can be magenta, and the color of the first charged particles 122 of the first sub-pixel structure 310c can be yellow.

Figure 7:
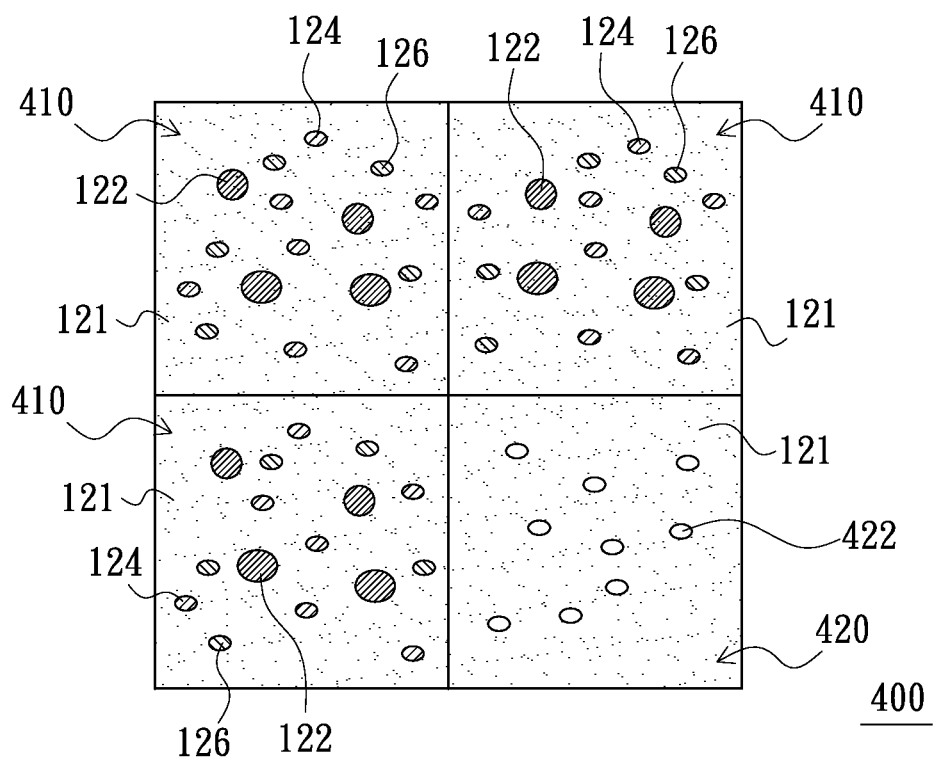
FIG. 7 is a schematic view of a pixel structure of color electrophoretic display according to a fifth embodiment of the present invention.

FIG. 7 is a schematic view of a pixel structure of color electrophoretic display according to a fifth embodiment of the present invention. Referring to FIGS. 3 and 7, the pixel structure 400 of the present embodiment includes a plurality of first sub-pixel structures 410 and a second sub-pixel structure 420. Each of the first sub-pixel structures 410 includes a first driving unit, a first display unit and a first transparent electrode. The first transparent electrode is used as a common electrode for the first sub-pixel structures 410. In the present embodiment, each of the first sub-pixel structures 410 can be the sub-pixel structure 100' of the second embodiment, but the colors of the first charged particles 122, the second charged particles 124 and the third charged particles 126 are different from that of the second embodiment. For example, the first charged particles 122 have the same color, the second charged particles 124 have the same color, the third charged particles 126 have the same color, and the colors of the first charged particles 122, the second charged particles 124 and the third charged particles 126 of the first sub-pixel structure 410 include cyan, magenta and yellow. A detail description of the first driving unit, the first display unit and the first transparent electrode can refer to the description of the driving unit 110, the display unit 120 and the transparent electrode 130 of the first embodiment and is not repeated herein.

The second sub-pixel structure 420 includes a second driving unit, a second display unit and a second transparent electrode, wherein a detail description of the second driving unit and the second transparent electrode can refer to the description of the driving unit 110 and the transparent electrode 130 of the first embodiment and is not repeated herein. Further, the second display unit of the second sub-pixel structure 420 includes a plurality of fourth charged particles 422. The color of the fourth charged particles 422 is different from the colors of the first charged particles 122, the second charged particles 124 and the third charged particles 126. The color of the fourth charged particles 422 is, for example, white. Moreover, diameters of the fourth charged particles 422 are smaller than the diameters of the first charged particles 122, and the ranges of the diameters of the second charged particles 124, the third charged particles 126 and the fourth charged particles 422 are, for example, the same.

In the present embodiment, the first sub-pixel structure 410 is capable of displaying cyan, magenta or yellow and the second sub-pixel structure 420 is capable of displaying white. A combination of the first sub-pixel structures 410 and the second sub-pixel structure 420 can let the pixel structure 400 be capable of displaying multiple different colors. Because the pixel structure 400 of the present embodiment does not need any color filter, the color electrophoretic display having a plurality of the pixel structures 400 can have better light utility efficiency, brightness, contrast and color saturation.

The method to let the first sub-pixel structures 410 display different colors is similar to that of the second embodiment and is not repeated herein. Moreover, the method to let the second sub-pixel structure 420 display white should be known by one skilled in the art and is not repeated herein. Furthermore, in another embodiment, the first charged particles 122 have the same color, the second charged particles 124 have the same color, the third charged particles 126 have the same color, and the colors of the first charged particles 122, the second charged particles 124 and the third charged particles 126 of the first sub-pixel structures 410 include red, green and blue. The color of the fourth charged particles 422 can be black.

In summary, a principle that charged particles with different diameters in a solution have different electrophoretic velocities is used in the sub-pixel structure of the present invention to drive the charged particles with different colors in order to display multiple colors. Because the sub-pixel structure of the present invention does not need any color filter, the light utility efficiency of the sub-pixel structure of the present invention can be improved. Moreover, the pixel structure of color electrophoretic display according to each embodiment of the present invention includes the abovementioned sub-pixel structures and a combination of the sub-pixel structures can achieve color effects. Because the pixel structure does not need any color filter, the light utility efficiency of the color electrophoretic display having a plurality of the pixel structures can be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A sub-pixel structure of color electrophoretic display comprising:
   a driving unit comprising an electrode;
   a display unit disposed on the driving unit, the display unit comprising a plurality of first charged particles and a plurality of second charged particles, a color of the first charged particles being different from a color of the second charged particles, diameters of the first charged particles being greater than diameters of the second charged particles, and the moving velocity of the second charged particles being greater than the moving velocity of the first charged particles; and
   a transparent electrode disposed on the display unit.

2. The sub-pixel structure of color electrophoretic display as claimed in claim 1, wherein a potential applied to the electrode is changed between a positive potential and a negative potential to change the color displayed by display unit.

3. The sub-pixel structure of color electrophoretic display as claimed in claim 1, wherein when a first potential is applied to the electrode to generate a first electrical field having a first electrical field direction, the second charged particles are moved to close to the transparent electrode in a first time so as to display the color of the second charged particles, and then the first charged particles are also moved to close to the transparent electrode in a second time later than the first time so as to display a mixed color of the colors of the first charged particles and the second charged particles.

4. The sub-pixel structure of color electrophoretic display as claimed in claim 3, wherein when a second potential is applied to the electrode to generate a second electrical field having a second field direction contrary to the first field direction, the second charged particles are moved away from the transparent electrode and the first charged particle are still located close to the transparent electrode in a third time later than the second time so as to display the color of the first charged particles.

5. A sub-pixel structure of color electrophoretic display comprising:
   a driving unit comprising an electrode;
   a display unit disposed on the driving unit, the display unit comprising a plurality of first charged particles and a plurality of second charged particles, a color of the first charged particles being different from a color of the second charged particles, and the first charged particles and the second charged particles having the same electrical property; and
   a transparent electrode disposed on the display unit,
   wherein when a first potential is applied to the electrode to generate a first electrical field having a first electrical field direction, the second charged particles are moved to close to the transparent electrode in a first time so as to display the color of the second charged particles, and then the first charged particles are also moved to close to the transparent electrode in a second time later than the first time so as to display a mixed color of the colors of the first charged particles and the second charged particles, when a second potential is applied to the electrode to generate a second electrical field having a second field direction contrary to the first field direction, the second charged particles are moved away from the transparent electrode and the first charged particle are still located close to the transparent electrode in a third time later than the second time so as to display the color of the first charged particles.

* * * * *